United States Patent
Ekin (10) Patent No.: US 10,943,362 B2
(45) Date of Patent: Mar. 9, 2021

(54) IMAGE PROCESSING FOR IMPROVED MARKER POSITIONING ON A LINE-SHAPED IMAGE FEATURE

(71) Applicant: KONINKLIJKE PHILIPS N.V., Eindhoven (NL)

(72) Inventor: Ahmet Ekin, Eindhoven (NL)

(73) Assignee: KONINKLIJKE PHILIPS N.V., Eindhoven (NL)

(*) Notice: Subject to any disclaimer, the term of this patent is extended or adjusted under 35 U.S.C. 154(b) by 279 days.

(21) Appl. No.: 15/774,303

(22) PCT Filed: Dec. 8, 2016

(86) PCT No.: PCT/EP2016/080200
§ 371 (c)(1),
(2) Date: May 8, 2018

(87) PCT Pub. No.: WO2017/102530
PCT Pub. Date: Jun. 22, 2017

(65) Prior Publication Data
US 2020/0258251 A1    Aug. 13, 2020

(30) Foreign Application Priority Data

Dec. 18, 2015 (EP) ..................................... 15201270

(51) Int. Cl.
G06T 7/60 (2017.01)
G06T 7/73 (2017.01)
G06T 7/68 (2017.01)

(52) U.S. Cl.
CPC .................. G06T 7/73 (2017.01); G06T 7/68 (2017.01); G06T 2207/30204 (2013.01)

(58) Field of Classification Search
CPC ... G06T 2207/20101; G06T 7/73; G06T 7/12; G06T 7/155; G06T 7/13; G06T 7/66;
(Continued)

(56) References Cited

U.S. PATENT DOCUMENTS 6,122,398 A * 9/2000 Yokomae (nee Takano) ............. G06K 9/32
382/152
7,302,288 B1 11/2007 Schellenberg
(Continued)

OTHER PUBLICATIONS

Michael Gleicher, "Image Snapping", Advanced Technology Group Apple Computer, Inc., (c) 1995 ACM-0-89791-701-4/95/008, pp. 183-190. (Year: 1995).*
(Continued)

*Primary Examiner* — Brian Werner (57) ABSTRACT

An image processing device (400), comprising an image input interface (402) configured to receive input pixel values allocated to pixels in a two-dimensional pixel grid, a marker input interface (404) configured to receive marker position data indicative of a position of a marker within the pixel grid, and a marker position refining unit (406) configured to identify, using the pixel data and the marker position data, a target pixel having a highest symmetry value, i.e. identification value, which has been determined based on weighed symmetry values of the pixels within a search region that includes the marker position, and to determine a refined marker position data as the position data of the target pixel.

9 Claims, 7 Drawing Sheets

(58) Field of Classification Search
CPC ...... G06T 2210/41; G06T 2207/30172; G06K 9/00402–00416; G06K 2209/05; G06K 2209/051; G06K 2209/053; G06K 2209/055; G06K 2209/057
See application file for complete search history.

(56) References Cited

U.S. PATENT DOCUMENTS

| | | |
|---|---|---|
| 7,877,131 B2 | 1/2011 | Jansen et al. |
| 8,229,186 B2 | 7/2012 | Milstein et al. |
| 9,468,538 B2 | 10/2016 | Nycz |
| 2014/0289605 A1* | 9/2014 | Buelow .................. A61B 6/468 715/232 |
| 2016/0171714 A1 | 6/2016 | Ekin et al. |
| 2016/0302754 A1 | 10/2016 | Bracken et al. |

OTHER PUBLICATIONS

Petkovic, T. et al., "Real-time 3D position reconstruction of guide-wire for monoplane X-ray", Comp. Med. Imag. Graphics., 38 (2014), pp. 211-223.

* cited by examiner

IMAGE PROCESSING FOR IMPROVED MARKER POSITIONING ON A LINE-SHAPED IMAGE FEATURE

CROSS-REFERENCE TO PRIOR APPLICATIONS

This application is the U.S. National Phase application under 35 U.S.C. § 371 of International Application Ser. No. PCT/EP2016/080200, filed on Dec. 8, 2016, which claims the benefit of European Patent Application No. 15201270.4, filed on Dec. 18, 2015. This application is hereby incorporated by reference herein.

FIELD OF THE INVENTION

The present invention relates to an image processing device, to an image display apparatus, to a method for processing image data, a method for image display, and to a computer program.

BACKGROUND OF THE INVENTION

U.S. Pat. No. 8,229,186 describes a method of centerline determination for a tubular tissue in a medical image data set defined in a data space, comprising receiving at least one start point and one end point inside a tubular tissue volume; automatically determining a path between said points that remains inside said volume; automatically segmenting said tubular tissue using said path; and automatically determining a centerline for said tubular tissue from said segmentation. Receiving, determining a path, segmenting, and determining a centerline are performed on a same data space of the medical image data set.

The received user indicated start and end points may depend on factors such as the accuracy of input devices, image zoom level, the user's current physical or mental condition or the image characteristics, and therefore lack positional accuracy.

SUMMARY OF THE INVENTION

It is an object of the present invention to ensure a correct and accurate positioning of user indicated positions on a two-dimensional image including a line-shaped image feature.

According to a first aspect of the present invention, an image processing device is presented. The device comprises:

an image input interface, which is configured to receive input pixel values allocated to pixels in a two dimensional pixel grid and representing an image having at least one line-shaped image feature exhibiting an input pixel value contrast between those pixels inside the line-shaped image feature and neighboring pixels outside the line-shape;

a marker input interface, which is configured to receive marker position data indicative of a position of a marker within the pixel grid, the marker serving for indicating a location on the line-shaped image feature; and a marker position refining unit, which is configured to determine, using the pixel data and the marker position data, refined marker position data indicative of a refined marker position with respect to the two-dimensional pixel grid;

wherein the marker position refining unit is further configured to determine, using the marker position data, a search region covering a predetermined image region that includes the marker position, and to determine, for each pixel within the search region, hereinafter pixel under computation, a contiguous computation region formed by at least two pixel windows, the pixel windows extending along at least two different pixel lines up to respective end pixels of the pixel windows, the pixel windows containing the pixel under computation as a center pixel of the respective pixel window, to determine for each of the pixel windows, a respective value of a symmetry measure indicative of a local mirror symmetry grade of the input pixel values with reference to a line which passes through the pixel under computation and is perpendicular to the pixel line along which the pixel window extends, to determine, for each of the pixel windows, a respective weighed symmetry value using the value of the symmetry measure determined for the pixel window and a symmetry weighing factor that is defined so as to increase in magnitude with an increasing contrast difference amount between the input pixel value of the center pixel and the input pixel values of the end pixels of the pixel window; and to identify a target pixel among the pixels within the search region by determining for each pixel a respective symmetry value based on the weighed symmetry values determined for the respective pixel and by determining the pixel for which a highest symmetry value has been determined, and to determine the refined marker position data as the position data of the target pixel.

The image processing device of the first aspect of the invention therefore improves the positioning of a marker on a line-shaped image feature in an image, the marker serving for indicating a location on the line-shaped image feature. The image processing device achieves a determination of refined marker position data in the image.

The image processing device is based on the recognition that a marker in an image, while intended to be located in the image at a position exactly on a line-shaped image feature, is often incorrectly positioned by user input, which nowadays is often provided by pointing tools such as a computer mouse or by a finger on a touch display. Such incorrect positioning of a marker with respect to a line-shaped image feature may due to one or a combination of various factors such as an accuracy of a chosen input device, an image zoom level, the user's mental or physical condition or characteristics of the image.

To achieve a correct positioning of the marker based even on such incorrect or at least inaccurate initial marker position data received at the marker input interface, the image processing device has a marker position refining unit, which refines the marker position data received. The marker position refining unit makes use of symmetry properties of a line-shaped image feature for determining the refined marker position.

Line-shaped image features are in particular image features with a longitudinal extension that exceeds a lateral extension, wherein a lateral direction is a direction within the image that is perpendicular to the longitudinal extension. The direction of the longitudinal extension may vary, as line-shaped image features may relate to bent, curved or meandering imaged objects. Along with the direction of longitudinal extension varies the direction of the lateral extension. A line-shaped image feature exhibiting an input pixel value contrast between those pixels inside the line-shaped image feature and neighboring pixels outside the line-shape is particularly suited for refining a marker position using the image processing device of the first aspect of the present invention. Examples of line-shaped feature are images of interventional devices such as catheters, guidewires, needles, threads, nails, etc.

For refining received marker position data serving for indicating a location on the line-shaped image feature, the device determines a search region in the image. The search region includes the marker position received via the marker input interface. Based on the input pixel values of pixels located within a contiguous computation region formed by at least two pixel windows each comprising at least one pixel sequence, it further determines symmetry measures indicative of a local symmetry grade of the pixel values with reference to at least two mirror lines. These mirror lines do not represent image features but are used as mathematical tools for determining mirror symmetry in the process of refining the marker position. They can suitably be defined with respect to the pixel grid.

The symmetry measures calculated in relation to the input pixel values are then used to determine weighed symmetry values. For this, a weighing factor is used, defined so as to increase in magnitude with an increasing contrast difference amount between the pixel input value of a center pixel and pixel values of respective end pixels of the pixel windows. For each pixel a respective symmetry value is determined based on the weighed symmetry values determined for the respective pixel, and the pixel is identified, for which a highest symmetry value has been determined. The position of this pixel is used as a refined marker position. Since the symmetry value, which is determined based on the weighed symmetry values, is used for identifying the pixel having the refined marker position, this symmetry value could be regarded as being an identification value.

For determining a respective symmetry value for a pixel based on the weighed symmetry values determined for this pixel, one of these weighed symmetry values might be selected and used as the symmetry value, which might be regarded as being an identification value. For instance, the highest weighed symmetry value or the lowest weighed symmetry value may be selected. The weighed symmetry values determined for the pixel can also be combined, in order to determine the symmetry value, i.e. the identification value, for this pixel. For instance, the weighed symmetry values determined for this pixel can be linearly combined, in order to determine a symmetry value, i.e. an identification value, for this pixel.

It should be noted that a mere high grade of mirror symmetry determined for a given pixel does not solve the problem because it could also apply for pixels that are entirely outside the line-shaped image feature. For example, pixels in a section of the image that has a poor contrast will appear as having a high grade or mirror symmetry. Such pixels would of course not be interesting for qualifying as a position on the line-shaped image feature. However, the use of the weighing factor achieves a distinction between high mirror-symmetry grades of pixels located within the line shaped image feature and pixels outside the line-shaped image feature.

The image processing device can be used to advantage in many fields of technology, wherein imaging techniques are applied, for instance in the context of medical imaging techniques, such as in X-ray radiography, magnetic resonance imaging, medical ultrasonography, endoscopy, thermography, medical photography and nuclear imaging techniques.

In the following, embodiments of the image processing device of the first aspect of the present invention will be described.

The input pixel values can be, in different embodiments, indicative of any color component of the image, e.g. in a RGB color code. In other embodiments the input pixel values are brightness values on a gray scale. The input pixel values may represent different types of image information, as will be elucidated by way of examples further below.

In one embodiment, the marker position refining unit is further configured to output the refined marker position data only if the symmetry value, which has been determined based on the weighed symmetry values determined for the respective pixel, satisfies a predetermined threshold constraint. This threshold constraint on the weighed symmetry value can be selected in a way as to define what a sufficient contrast of input pixel values is required for identification as a line-shaped image feature.

Depending, among other factors, on the input pixel values and the marker position data, a plurality of target pixels with the same highest weighed symmetry value may be identified in some images. In another embodiment therefore, the marker position refining unit is further configured, in case more than one target pixel is identified, to determine values of a distance measure between the target pixels and the received marker position data, and to determine the refined marker position data as the position data of that target pixel, which has the smallest value of the distance measure. This approach successfully resolves such ambiguities in the determination of the target pixel in most situations.

A proper selection of the computation region for each pixel of the search regions allows improving the performance of the marker position refining unit. In one embodiment, the marker position refining unit is configured to determine at least two of the pixel windows as pixel windows extending in mutually perpendicular directions within the two-dimensional pixel grid. In other embodiments the two different directions are preferably, but not necessarily perpendicular to each other. Embodiments that make use of computation regions with pixels windows extending in more than two directions of the two-dimensional pixel grid are possible, but require more computational effort. Therefore, it is advantageous to make use of only two directions perpendicular to each other.

It has also proven advantageous to use pixel windows comprising at least three sequences of pixels in order to determine the refined marker position. This makes the marker position refinement less sensitive to artifacts in the input pixels values. By determining the refined marker position data based on three pixels sequences in each of two pixel windows, the impact of artifacts is therefore reduced. In an embodiment that is particularly advantageous in terms of achieving low computational complexity, the two perpendicular directions correspond to the coordinate axes of the two-dimensional grid to which the input pixel values are allocated.

In another embodiment that enhances the performance of the image processing device, a filter unit is provided which is configured to receive initial pixel values allocated to the pixels in the two-dimensional pixel grid and representing an initial image, to transform the initial pixel values using a predetermined transformation rule, and to provide the transformed initial pixel values as the input pixel values to the image input interface. In some embodiments the predetermined transformation rules implement a filter to enhance line-shaped image features, such as vesselness filter. In one particular embodiment, the filter unit implements the vessel enhancement filter of Frangi as a transformation rule to transform the initial pixel values into the input pixel values. A transformation according to the filter on Frangi comprises the computation of second order derivatives and the eigenvalues of a Hessian matrix for each pixel to determine a vesselness value. These vesselness values form an improved pixel basis for identifying a line-shaped structure in an image. Other embodiments apply a transformation rule which further comprises the equalization of the vesselness values obtained by applying the vesselness filter in order to obtain a more balanced distribution which clamps the impact of some background objects that may also have large vesselness values.

In another embodiment, the filter unit is configured to receive the marker position data and to determine, based on the received marker position data, a limited filtering region that forms a fraction of the initial image and to transform the initial pixel values of only the filtering region. In this embodiment, only a fraction of the initial image is processed upon receiving the marker position data. This results in less computational effort. However, in order to start the transformation, the filter unit has to wait for receiving the marker position data.

A further advantageous embodiment comprises a filter unit which, upon receiving the initial pixel values, immediately starts to transform the initial pixel values. When it receives the marker position data, it determines if the corresponding limited filtering region has been transformed and, if it is not, starts transforming the limited filtering region. The limited filtering region for a determined marker position data includes at least all of the pixels forming part of the pixel windows corresponding to the pixels included in the search region determined based on the marker position.

According to a second aspect of the present invention, an image display apparatus is provided. The image display apparatus comprises an image processing device according to the first aspect of the invention or one of its embodiments, and a display unit, which is connected with the image processing device and configured to display the pixels representing the image in a two-dimensional pixel grid and to display at least one marker at a position in the pixel grid defined by the refined marker position data received from the image processing device.

The image display apparatus shares the advantages of the image processing device of the first aspect of the invention.

According to a third aspect of the invention, a method for processing image data is presented. The method comprises:
 receiving input pixel values allocated to pixels in a two-dimensional pixel grid and representing an image having at least one line-shaped image feature exhibiting an input pixel value contrast between those pixels inside the line-shaped image feature and neighboring pixels outside the line-shape;
 receiving marker position data indicative of a position of a marker within the pixel grid, the marker serving for indicating a location on the line-shaped image feature; and
 determining, using the pixel data and the marker position data, refined marker position data indicative of a refined marker position with respect to the two-dimensional pixel grid;
 wherein determining the refined marker position further comprises:
  determining, using the marker position data, a search region covering a predetermined image region that includes the marker position, and
  determining, for each pixel within the search region, hereinafter pixel under computation, a contiguous computation region formed by at least two pixel windows, the pixel windows extending along at least two different pixel lines up to respective end pixels of the pixel windows, the pixel windows containing the pixel under computation as a center pixel of the respective pixel window,
  determining for each of the pixel windows, a respective value of a symmetry measure indicative of a local mirror symmetry grade of the input pixel values with reference to a line, which passes through the pixel under computation and is perpendicular to the pixel line along which the pixel window extends,
  determining, for each of the pixel windows, a respective weighed symmetry value using the value of the symmetry measure determined for the pixel window and a symmetry weighing factor that is defined so as to increase in magnitude with an increasing contrast difference amount between the input pixel value of the center pixel and the input pixel values of the end pixels of the pixel window;
  identifying a target pixel among the pixels within the search region by determining for each pixel a respective symmetry value based on the weighed symmetry values determined for the respective pixel and by determining the pixel for which a highest symmetry value has been determined; and
  determining the refined marker position data as the position data of the target pixel.

The method of the third aspect of the present invention shares the advantages presented on the context of the device of the first aspect of the invention but is not limited to it. Also embodiments of the method employ additional method steps corresponding to the function of the additional features of the embodiment of the device of the first aspect of the invention.

A fourth aspect of the present invention is formed by a computer program comprising executable code for executing a method for processing image data according to the third aspect of the present invention when executed by a processor of a computer. It shall be understood that the image processing device of claim 1, the image display apparatus of claim 7, the method for processing image data according to claim 8, and the computer program of claim 9, have similar and/or identical preferred embodiments, in particular, as defined in the dependent claims.

It shall be understood that a preferred embodiment of the present invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

FIG. 1A to 1D are illustrations of a two-dimensional pixel grid 100 that forms an image having a line-shaped image feature 102. The line-shaped image feature exhibits a pixel value contrast between those pixels inside the line-shaped image feature (darker) and neighboring pixels (lighter) outside the line-shape. The line-shaped image feature 102 is therefore formed by pixels having input pixel values distinguishably distinct from the neighboring pixels not forming part of it.

Figure 4:
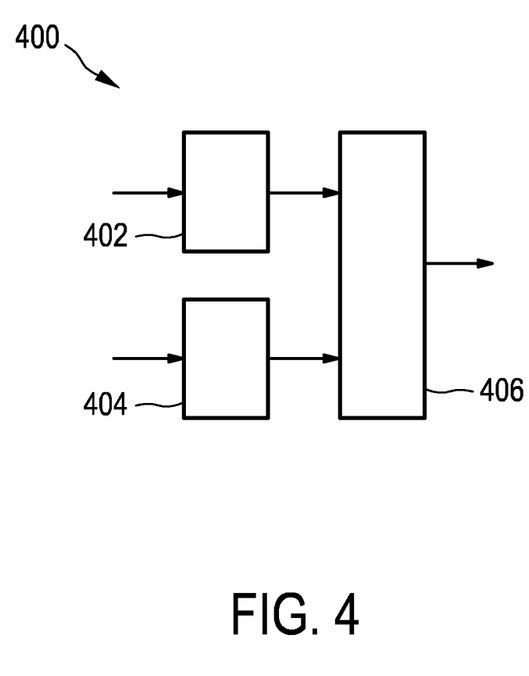
FIG. 4 is a block diagram of an embodiment of an image processing device.

The following description in parallel refers to FIG. 4. FIG. 4 is a block diagram of an embodiment of an image processing device 400. The device 400 comprises an image input interface 402, which is configured to receive input pixel values allocated to pixels in a two-dimensional grid and representing an image having at least one line-shaped image feature, a marker input interface 404 which is configured to receive marker position data indicative of a position of a marker within the pixel grid, the marker serving for indicating a location on the line-shaped image feature and a marker position refining unit 406, which is configured to determine refined marker position data indicative of a refined marker position with respect to the two-dimensional pixel grid. Examples of how the refined position data is determined are explained in reference to FIGS. 1A, 1B and 1C. The input pixel values are, for example, values indicative of a RGB color component of a given pixel, values indicative of the grayscale value, or transformed values obtained after applying a predetermined filter using a corresponding transformation rule. The input pixels values are received by the image input interface 402.

Marker position data indicative of a position of a marker 104 within the pixel grid 100 is received by the marker input interface 404. The position of the marker 104 is indicated by a bold square of one pixel size. Of course, any other marker symbol may be used. The marker 104 is intended to indicate a location on the line-shaped image feature 102, most favorably on a center line with reference to the longitudinal extension of the line-shaped feature 102. The marker position is represented by marker position data. An initial marker position within the pixel grid 100 is typically determined by a user interacting with an input device. In different embodiments, the user may have selected a marker position of the marker 104 on the image by using a cursor controlled by a mouse, a keyboard, a pointing device on a touch or similar position input interfaces. However, due to factors such as the accuracy of input devices, the image zoom level, the user's current physical or mental condition or the image characteristics, it may not be accurately positioned at the desired central position.

Figure 1A:
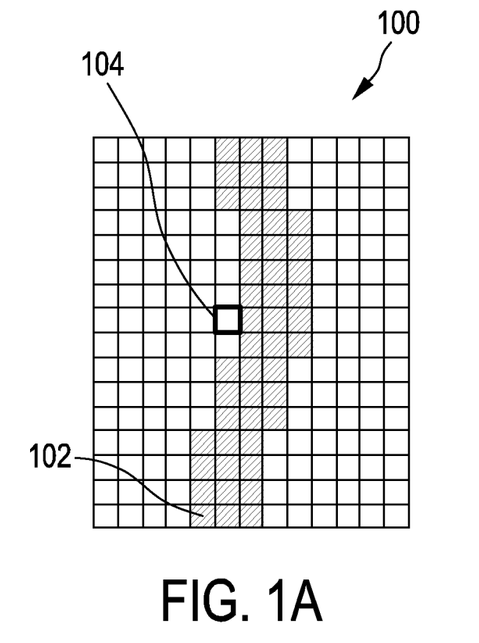
FIG. 1A to 1D show a two-dimensional pixel grid including a line-shaped image feature before during and after image processing in accordance with an embodiment of the invention.
Figure 1B:
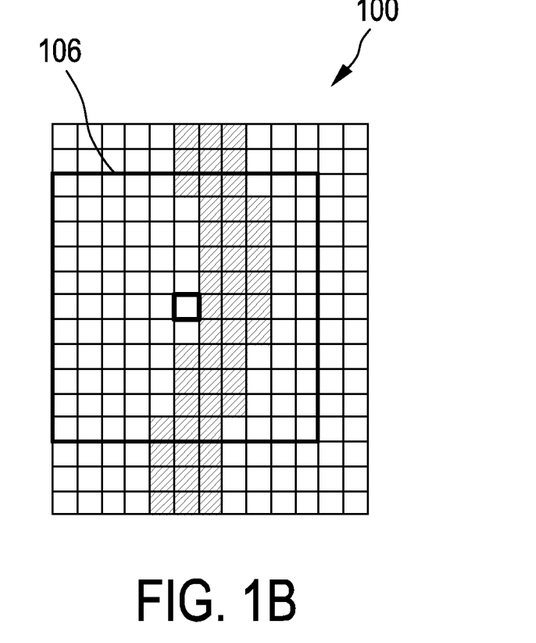

FIG. 1B illustrates a search region 106 covering a predetermined image region that includes the marker position 104. The search region 106 is determined by the marker position refining unit 406 using the marker position data of the marker 104 and a predetermined search region extension. In some embodiments the search region does not necessarily have the marker 104 at its center.

Figure 1C:
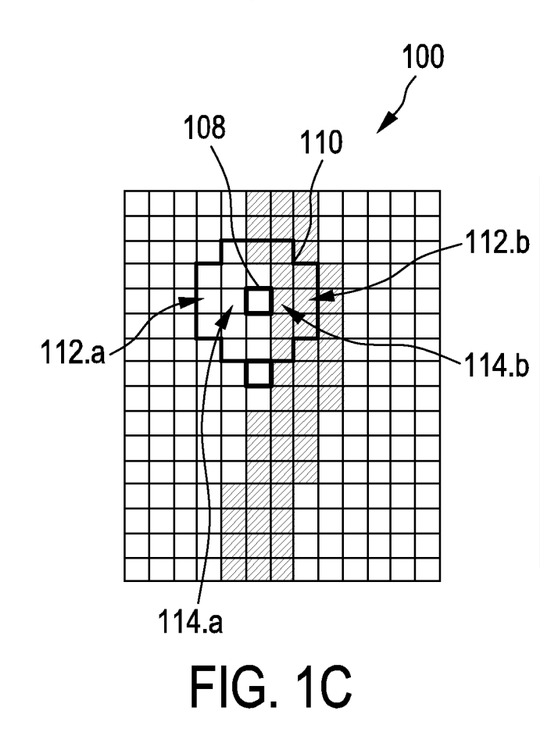

FIG. 1C illustrates a computation region 110 determined by the marker position refining unit 406. For each pixel (hereinafter pixel under computation) in the search region 106 shown in FIG. 1B, a contiguous computation region is determined. For example, for computation pixel 108 located within the search region 106 determined for marker 104, the computation region 110 is determined. A computation region is formed by at least two pixel windows extending along at least two different pixel lines up to respective end pixels of the pixel windows, the pixel windows containing the pixel under computation as a center pixel of the respective pixel window. Each of the two pixel windows forming the contiguous computation region 110 in this explanatory example is formed by three pixel sequences, each having 5 pixels. One pixel window extends in a vertical direction and the second pixel window extends in a horizontal direction, according to the representation of the pixel grid 100. Both pixel windows contain the pixel under computation 108. The size of the pixel windows is suitably determined based on an image resolution (total number of pixels), a degree of magnification of imaged objects, and a zoom factor used (if applicable). For instance, a pixel window can be selected to extend over a region of some millimeters of the imaged object in two directions of the image plane, for instance over 3 millimeter, 4 millimeter or 5 millimeter. The size of the pixel windows forming the computation region determines a maximum range of refinement of the marker position. The computation region suitably extends over an image region larger than the width of the line-shaped image feature.

Figure 1D:
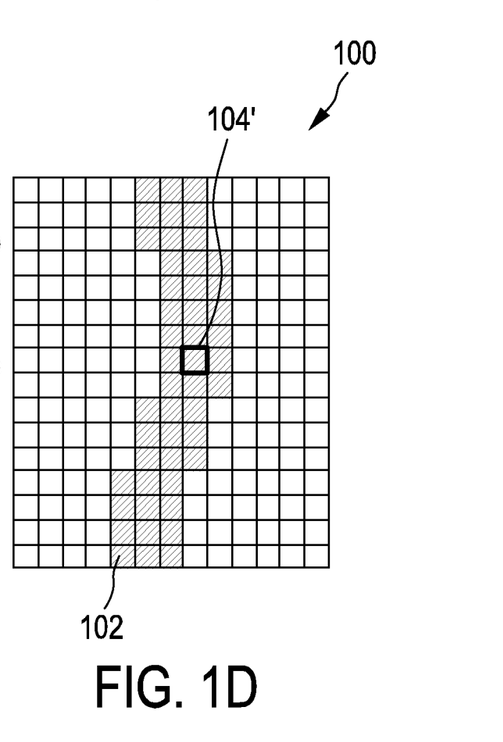

FIG. 1D represents a pixel grid 100 where a target pixel 104' having a highest weighed symmetry value among the weighed symmetry values of the pixels with the search region 106 has been identified by the marker position refining unit 406. Various alternatives to identify target pixels are discussed in the following.

The marker position refining unit 406 of the image processing device 400, upon receiving marker position data of the marker 104, determines the search region 106. For each pixel in the search region, hereinafter pixel under computation, it determines a computation region formed by two windows, each window comprising sequences of pixels.

For each pixel window within the computation region 110 of a pixel under computation 108, a value of a symmetry measure indicative of a local mirror symmetry grade of the input pixel values with reference to at least two mirror lines, which pass through the pixel under computation and are perpendicular to a respective one of the pixel lines, is determined. In this exemplary embodiment the mirror lines run in the vertical and horizontal directions.

An example of an advantageous local mirror symmetry grade determination operation includes the calculation of a sum of modules of input pixel value differences between those pixels located at either side of the pixel 108 under computation had having the same distance to it. An example involves subtracting the input pixel values of pixels 112.$a$ and 112.$b$ and of pixels 114.$a$ and 114.$b$, and adding the modules of these subtraction operations. A pixel located at a highly symmetric pixel position has a low amount of this sum. In some embodiments such as the one described in FIG. 1C, this operation is performed for the three pixel lines in each coordinate direction in order to obtain a smooth estimate of symmetry in case the middle sequence presents an artifact in the pixels values, i.e. an input pixel value not corresponding to the real image but to a distortion caused by, for instance, an error in the digitalization process. By computing the symmetry operation over more than one line, the impact of these artifacts is reduced.

A weighing factor is used in combination with the operations described above to determine weighed symmetry values with reference to two directions perpendicular to the mirror lines. This achieves a high weight—in magnitude—, if the ends of the pixel lines are located outside the line shaped image feature and the pixel under computation is located inside the line shaped image feature. An exemplary weighing factor used in some embodiments is determined by adding the input pixel values of the pixels located at both ends of a given pixel window and subtracting twice the value of the pixel located at the center of the pixel sequence. The value of the weighing factor thus enables the distinction of pixel segments included within or outside the line shaped image feature (e.g. parallel to it), which result in a low weighing factor, and pixel sequences which transverse the line shaped image feature and have their ends outside the feature but their centers inside, thus resulting in a higher module value compared to the former case.

In a particular embodiment, the determination of a maximum weighed symmetry value is performed for a pixel located at a position $(x_c, y_c)$ in the two-dimensional pixel grid using two pixel windows, one in each of the two coordinate directions x (e.g. horizontal direction) and y (e.g. vertical direction) and being formed by a single pixel sequence of length N (N being an odd positive integer), and a weighing factor. The calculations performed by the image processing device with respect to the input pixel values P(x,y) are, in this particular case:

$$SNWX(x_c, y_c) = \sum_{k=0}^{(N-1)/2} |P(x_{c+k}, y_c) - P(x_{c-k}, y_c)|$$

$$SNWY(x_c, y_c) = \sum_{k=0}^{(N-1)/2} |P(x_c, y_{c+k}) - P(x_c, y_{c-k})|$$

$$WFX(x_c, y_c) = P(x_{c+(N-1)/2}, y_c) + P(x_{c-(N-1)/2}, y_c) - 2 \times P(x_c, y_c)$$

$$WFX(x_c, y_c) = P(x_c, y_{c-(N-1)/2}) + P(x_c, y_{c+(N-1)/2}) - 2 \times P(x_c, y_c)$$

$$SymmetryValue(x_c, y_c) = \min[WFX \times SNWX, WFY \times SNWY],$$

where P(a,b) represents the input pixel value of the pixel located at the position (a,b) of the coordinate pixel grid, SNWX is the symmetry measure indicative of a local symmetry grade of the input pixel values with reference to a mirror line running along the vertical direction of the pixel grid and passing through the position $(x_c, y_c)$, SNWY is the symmetry measure indicative of a local symmetry grade of the input pixel values with reference to a mirror line running along the horizontal direction of the pixel grid and passing through the position $(x_c, y_c)$, WFX is the weighing factor calculated for the pixel window running in the horizontal direction of the pixel grid, WFY is the weighing factor calculated for the pixel window running in the vertical direction of the pixel grid and SymmetryValue is the minimum value of the determined weighed symmetry values for the two pixel windows.

Other embodiments use other operations between the SNWX and SNWY, and the weighing factors WFX, WFY to determine the value of the quantity SymmetryValue for each pixel in the search region, such as, but not limited to, assigning as a SymmetryValue value the symmetry measure (SNWX or SNWY) in the coordinate direction having the highest weighing factor. In embodiments where several pixel lines are evaluated in a given coordinate direction, different operation are performed to find the symmetry measures (SNWX and SNWY), such as, but not limited to, summing SNWX (SNWY) values obtained for each pixel line in the window and then multiplying this combined SNWX (SNWY) with WFX (WFY). The image processing then determines the refined marker position data as the position data of that pixel, which has a highest weighed symmetry value among the weighed symmetry values of the pixels within the search region device. In other embodiments, the SymmetryValues values are normalized or are assigned a discrete value indicative a single value range from a plurality of non-overlapping value ranges.

Figure 2:
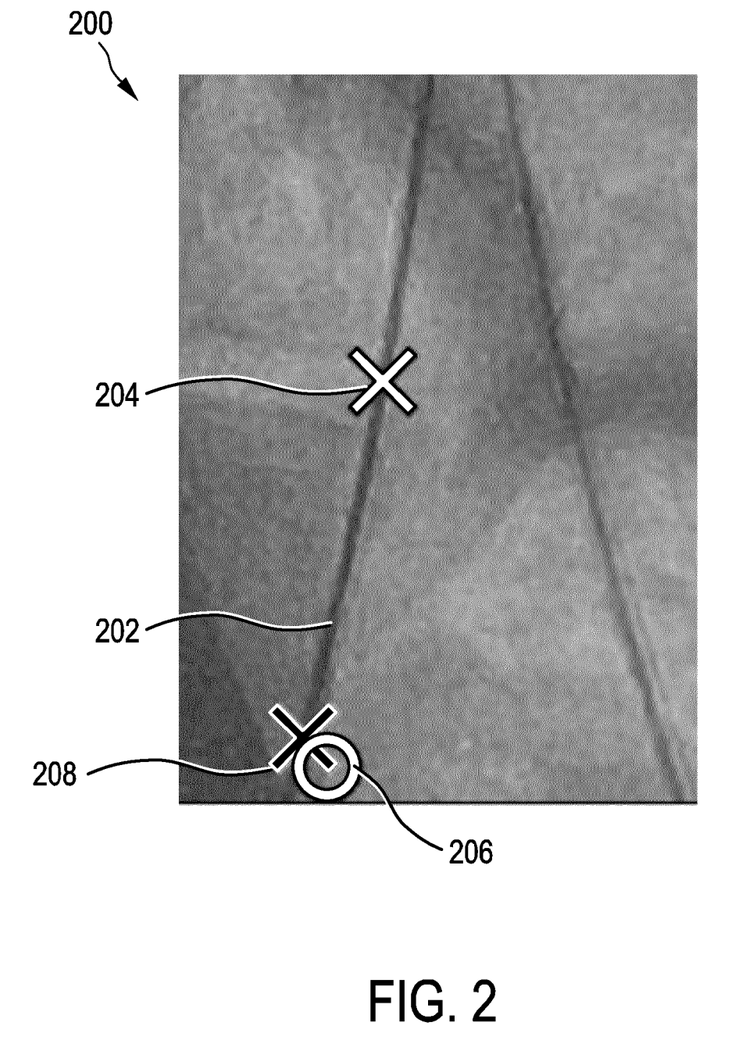
FIG. 2 shows another two-dimensional pixel grid including line-shaped image features.

FIG. 2 shows an image 200 formed by pixels having input pixel values and which has a line shaped image feature 202. In this embodiment, two marker position data 204 and 206 have been received. The image processing device 400 has determined, for both marker positions, the corresponding search regions, and has determined weighed symmetry values for all pixels within the respective search regions. In the case of marker position 204, the refined marker position coincides with the input marker position, i.e., the pixel indicated by the marker position has, in this particular example, the highest weighed symmetry value of all pixels within its search region. In the case of user input position 206, the image processing device was able to determine that there were pixels within the search region having, in this particular example, higher weighed symmetry values than that of the pixel indicated by the marker position. The image processing device thus determines refined marker position data indicative of a pixel which does not correspond to the input marker position. In this embodiment, the image is displayed together with markers indicative of the marker positions 204 and 206 and of the refined marker position 208. In this particular embodiment a distinction between those marker position data that have been refined (e.g. marker position data 206 refined to marker position data 208) and those which have not been refined (e.g. marker position 204) is made by using different marker data graphical representation (in color and or shape).

Figure 3:
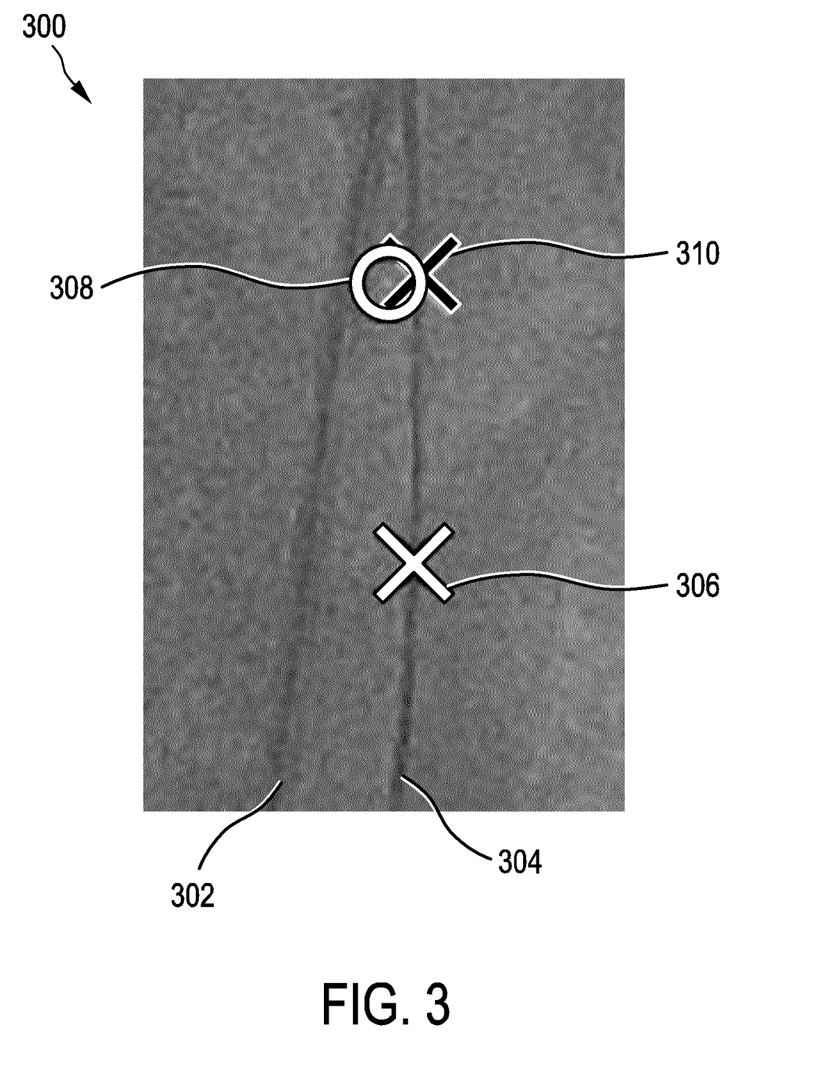
FIG. 3 shows another two-dimensional pixel grid including line-shaped image features.

FIG. 3 shows another two-dimensional pixel grid 300 including two line-shaped image features 302 and 304. In this embodiment, two marker position data 306 and 308 have been received. The image processing device 400 has determined, for both marker positions, the corresponding search regions and has determined weighed symmetry values for all pixels within the respective search regions. In the case of marker position 306, the refined marker position data coincides with the input marker position data, i.e., the pixel indicated by the marker position data has the highest weighed symmetry value of all pixels within its search region. In the case of user input position 308, the image processing device was able to determine that there were pixels within the search region having higher weighed symmetry values than that of the pixel indicated by the marker position. In embodiments where the search region corresponding to marker position data 308 includes a portion of several line-shaped image features, a plurality of target pixels with the same highest weighed symmetry value may be identified. In this embodiment, the marker position unit is configured to determine values of distance measure between every target pixel and the marker position data and then output the refined marker position 310 corresponding to the target pixel having a minimum value of the distance measure. The image processing device thus determines refined marker position data indicative of a pixel which does not correspond to the input marker position data. In this embodiment, the two-dimensional pixel grid 300 is displayed together with markers indicative of the marker positions 306 and 308 and of the refined marker position 310. In this particular embodiment a distinction between those marker position data that have been refined (e.g. marker position data 308 refined to marker position data 310) and those which have not been refined (e.g. marker position 306) is made by using different marker data graphical representation (in color and or shape).

Figure 5:
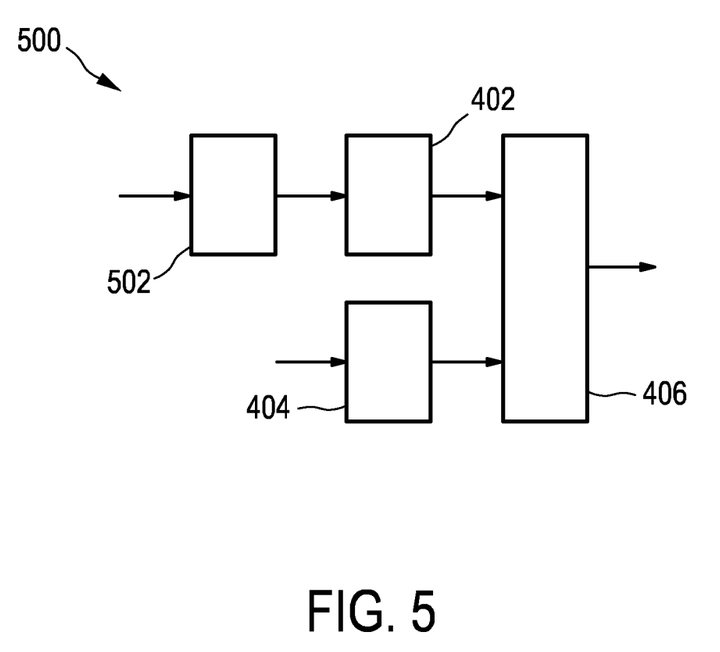
FIG. 5 is a block diagram of another embodiment of an image processing device.

FIG. 5 shows a block diagram of another embodiment of an image processing device 500. The device 500 comprises an image input interface 402, a marker input interface 404, a marker position refining unit 406, and a filter unit 502 which is configured to receive initial pixel values allocated to the pixels in the two-dimensional pixel grid and representing an initial image, to transform the initial pixel values using a predetermined transformation rule, and to provide the transformed initial pixel values as the input pixel values to the image input interface. Examples of predetermined transformation rules are, but are not limited to, filters to enhance line-shaped image features such as vesselness filters. A well-known example of such a vessellness filter is the filter of Frangi. A transformation according to the filter on Frangi includes the computation of second order derivatives and the eigenvalues of a Hessian matrix for each pixel to determine a vesselness value. These vesselness values are then used to determine the pixels corresponding to a line-shaped structure. Other embodiments apply a transformation rule which further comprises the equalization of the vesselness values obtained by applying the vesselness filter in order to obtain a more balance distribution which clamps the impact of some background objects that may also have large vesselness values.

Figure 6:
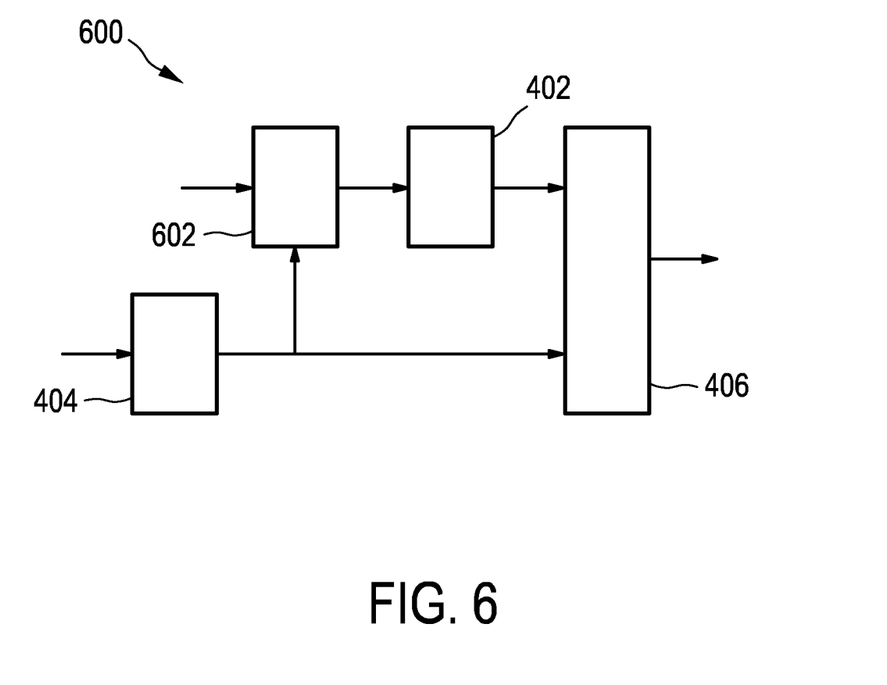
FIG. 6 is a block diagram of another embodiment of an image processing device.

FIG. 6 shows a block diagram of another embodiment of an image processing device 600 which comprises an image input interface 402, a marker input interface 404, a marker position refining unit 406, and a filter unit 602. In this embodiment, the filter unit 602 is further configured to receive the marker position data and to determine, based on the received marker position data, a limited filtering region that forms a fraction of the initial image and to transform the initial pixel values of only the filtering region. In this embodiment, only a fraction of the initial image is processed upon receiving the marker position data. This results in a computational easier embodiment. However, in order to start the transformation, the filter unit has to wait for the marker position data. An advantageous embodiment comprises a filter unit which, upon receiving the initial pixel values, starts to transform the initial pixel values. When it receives marker position data, it checks if the corresponding limited filtering region has been transformed and, if it is not, starts transforming the limited filtering region. The limited filtering region for a marker position data includes at least all of the pixels that would form part of the pixel windows corresponding to the pixels included in the search region determined based on the marker position.

Figure 7:
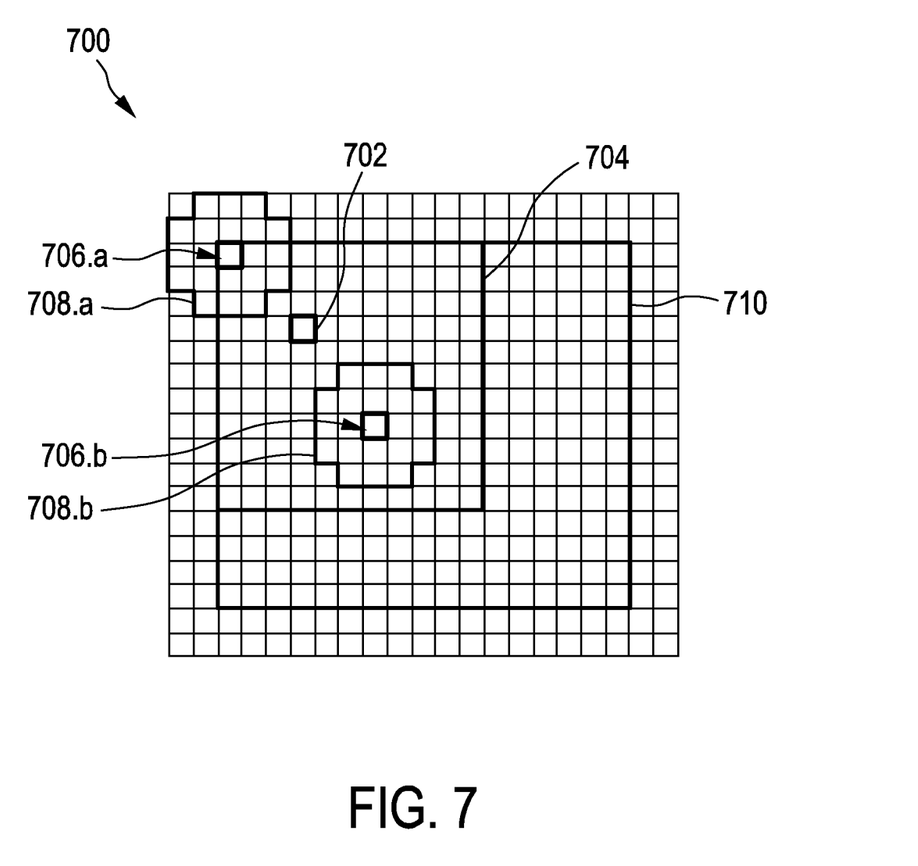
FIG. 7 shows another pixel grid during an image processing in accordance with an embodiment of the invention.

FIG. 7 shows a two coordinate pixel grid 700 during an image processing in accordance with an embodiment of the invention. A marker position data indicative of pixel 702 has been received by the marker input interface. The marker position refining unit determines a search region 704 that, in this embodiment does not have pixel 702 as a center position. The pixel windows used for the computation region have a length of 5 pixels in this embodiment and comprise three 5-pixel sequences in each of the two coordinate directions of the pixel grid. For an exemplary pixel 706.a within the search region 704, the determined computation region is region 708.a. For a second exemplary pixel 706.b within the search region 704, the determined computation region is region 708.b. In some embodiments, if the marker position data received is indicative of a pixel located outside a selectable region 710, the marker position refining unit is not able to refine the position of the marker position data and, in some embodiments, conveniently informs the user.

In some embodiments the marker position refining unit is configured to output the marker position data together with the refined marker position data, allowing thus the user to verify the validity of the refined marker position data and change it if he or she is dissatisfied. In other embodiments the marker position data and the refined marker position data are represented by different graphical representation of a marker (e.g. a cross, a circle, a star, a square, a dot, etc.) to facilitate the distinction between them.

In summary, thus, an image processing device comprises an image input interface configured to receive input pixel values allocated to pixels in a two-dimensional pixel grid, a marker input interface configured to receive marker position data indicative of a position of a marker within the pixel grid, and a marker position refining unit configured to identify, using the pixel data and the marker position data, a target pixel having a highest symmetry value, i.e. identification value, which has been determined based on weighed symmetry values of the pixels within a search region that includes the marker position, and to determine a refined marker position data as the position data of the target pixel.

While the present invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single step or other units may fulfill the functions of several items recited in the claims. The mere fact that certain measures are recited in mutually different dependent claims does not indicate that a combination of these measures cannot be used to advantage.

Any reference signs in the claims should not be construed as limiting the scope.

The invention claimed is:

1. An image processing device, comprising:
an image input interface, which is configured to receive input pixel values allocated to pixels in a two-dimensional pixel grid and representing an image having at least one line-shaped image feature exhibiting an input pixel value contrast between those pixels inside the line-shaped image feature and neighboring pixels outside the line-shape;
a marker input interface, which is configured to receive marker position data indicative of a position of a marker within the pixel grid, the marker serving for indicating a location on the line-shaped image feature; and
a marker position refining unit, which is configured to determine, using the pixel data and the marker position data, refined marker position data indicative of a refined marker position with respect to the two-dimensional pixel grid;
wherein the marker position refining unit is further configured to determine, using the marker position data, a search region covering a predetermined image region that includes the marker position, and to determine, for each pixel within the search region, hereinafter pixel under computation, a contiguous computation region formed by at least two pixel windows, the pixel windows extending along at least two different pixel lines up to respective end pixels of the pixel windows, the pixel windows containing the pixel under computation as a center pixel of the respective pixel window, to determine, for each of the pixel windows, a respective value of a symmetry measure indicative of a local mirror symmetry grade of the input pixel values with reference to a line which passes through the pixel under computation and is perpendicular to the pixel line along which the pixel window extends, to determine, for each of the pixel windows, a respective weighed symmetry value using the value of the symmetry measure determined for the pixel window and a symmetry weighing factor that is defined so as to increase in magnitude with an increasing contrast difference amount between the input pixel value of the center pixel and the input pixel values of the end pixels of the pixel window; and to identify a target pixel among the pixels within the search region by determining for each pixel a respective symmetry value based on the weighed symmetry values determined for the respective pixel and by determining the pixel for which a highest symmetry value has been determined, and to determine the refined marker position data as the position data of the target pixel.

2. The image processing device of claim 1, wherein the marker position refining unit is further configured to output the refined marker position data only if the symmetry value, which has been determined based on the weighed symmetry values determined for the respective pixel, satisfies a predetermined threshold constraint.

3. The image processing device of claim 1, wherein the marker position refining unit is further configured, in case more than one target pixel is identified, to determine values of a distance measure between the target pixels and the received marker position data, and to determine the refined marker position data as the position data of that target pixel, which has the smallest value of the distance measure.

4. The image processing device of claim 1, wherein the marker position refining unit is configured to determine at least two of the pixel windows as pixel windows extending in mutually perpendicular directions within the two-dimensional pixel grid.

5. The image processing device of claim 1, further comprising a filter unit, which is configured to receive initial pixel values allocated to the pixels in the two-dimensional pixel grid and representing an initial image, to transform the initial pixel values using a predetermined transformation rule, and to provide the transformed initial pixel values as the input pixel values to the image input interface.

6. The image processing device of claim 5, wherein the filter unit is configured to receive the marker position data and to determine, based on the received marker position data, a limited filtering region that forms a fraction of the initial image and to transform the initial pixel values of only the filtering region.

7. An image display apparatus, comprising an image processing device of claim 1 and a display unit, which is connected with the image processing device and configured to display the pixels representing the image in a two-dimensional pixel grid and to display at least one marker at a position in the pixel grid defined by the refined marker position data received from the image processing device.

8. A method for processing image data, the method comprising:

receiving input pixel values allocated to pixels in a two-dimensional pixel grid and representing an image having at least one line-shaped image feature exhibiting an input pixel value contrast between those pixels inside the line-shaped image feature and neighboring pixels outside the line-shape;

receiving marker position data indicative of a position of a marker within the pixel grid, the marker serving for indicating a location on the line-shaped image feature; and determining, using the pixel data and the marker position data, refined marker position data indicative of a refined marker position with respect to the two-dimensional pixel grid;

wherein determining the refined marker position further comprises:

determining, using the marker position data, a search region covering a predetermined image region that includes the marker position, and determining, for each pixel within the search region, hereinafter pixel under computation, a contiguous computation region formed by at least two pixel windows, the pixel windows extending along at least two different pixel lines up to respective end pixels of the pixel windows, the pixel windows containing the pixel under computation as a center pixel of the respective pixel window, determining for each of the pixel windows, a respective value of a symmetry measure indicative of a local mirror symmetry grade of the input pixel values with reference to a line, which passes through the pixel under computation and is perpendicular to the pixel line along which the pixel window extends, determining, for each of the pixel windows, a respective weighed symmetry value using the value of the symmetry measure determined for the pixel window and a symmetry weighing factor that is defined so as to increase in magnitude with an increasing contrast difference amount between the input pixel value of the center pixel and the input pixel values of the end pixels of the pixel window;

identifying a target pixel among the pixels within the search region by determining for each pixel a respective symmetry value based on the weighed symmetry values determined for the respective pixel and by determining the pixel for which a highest symmetry value has been determined; and determining the refined marker position data as the position data of the target pixel.

9. A non-transitory computer readable medium storing a computer program comprising executable code for executing a method for processing image data according to claim 8 when executed by a processor of a computer.

* * * * *